US011551687B2

(12) United States Patent
Hwang et al.

(10) Patent No.: US 11,551,687 B2
(45) Date of Patent: Jan. 10, 2023

(54) ELECTRONIC DEVICE AND METHOD FOR SPEECH RECOGNITION OF THE SAME

(71) Applicant: Samsung Electronics Co., Ltd., Suwon-si (KR)

(72) Inventors: Dohyeong Hwang, Suwon-si (KR); Jongyeong Shin, Suwon-si (KR); Guwon Jeong, Suwon-si (KR); Hyoung-Jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 16/935,425

(22) Filed: Jul. 22, 2020

(65) Prior Publication Data

US 2021/0043204 A1 Feb. 11, 2021

(30) Foreign Application Priority Data

Aug. 8, 2019 (KR) .................. 10-2019-0096559

(51) Int. Cl.
*G10L 15/22* (2006.01)
*G10L 25/84* (2013.01)
*G10L 15/08* (2006.01)

(52) U.S. Cl.
CPC .............. *G10L 15/22* (2013.01); *G10L 15/08* (2013.01); *G10L 25/84* (2013.01); *G10L 2015/088* (2013.01)

(58) Field of Classification Search
CPC .............................. G10L 15/22; G10L 15/08
See application file for complete search history.

(56) References Cited

U.S. PATENT DOCUMENTS

| 7,676,363 | B2 | 3/2010 | Chengalvarayan et al. |
| 9,070,367 | B1* | 6/2015 | Hoffmeister .......... G10L 15/063 |
| 10,777,189 | B1* | 9/2020 | Fu .......................... G10L 15/22 |
| 10,789,943 | B1* | 9/2020 | Lapshina ............ G10L 15/1815 |
| 2002/0049587 | A1 | 4/2002 | Miyazawa |
| 2005/0071159 | A1 | 3/2005 | Boman et al. |
| 2017/0110117 | A1* | 4/2017 | Chakladar ............. G10L 15/142 |
| 2017/0230497 | A1* | 8/2017 | Kim ........................ G10L 15/22 |

(Continued)

FOREIGN PATENT DOCUMENTS

| EP | 1 386 574 A2 | 2/2004 |
| EP | 1 386 574 A3 | 1/2006 |

(Continued)

OTHER PUBLICATIONS

International Search Report dated Nov. 13, 2020, issued in International Application No. PCT/KR2020/009709.

(Continued)

*Primary Examiner* — Mark Villena
(74) *Attorney, Agent, or Firm* — Jefferson IP Law, LLP

(57) ABSTRACT

An electronic device for recognizing a user's speech and a speech recognition method therefor are provided. The electronic device includes a microphone configured to receive a user's speech, a memory for storing speech recognition models, and at least one processor configured to select a speech recognition model from among the speech recognition models stored in the memory based on an operation state of the electronic device, and recognize the user's speech received by the microphone based on the selected speech recognition model.

23 Claims, 13 Drawing Sheets

(56) References Cited

U.S. PATENT DOCUMENTS

2018/0277113 A1* 9/2018 Hartung ................ G10L 15/08
2019/0043529 A1* 2/2019 Muchlinski ............ G10L 15/22
2019/0371311 A1* 12/2019 Patel ..................... G10L 15/22

FOREIGN PATENT DOCUMENTS

| JP | 2007-264328 A | 10/2007 |
| KR | 10-2015-0126214 A | 11/2015 |
| KR | 10-2016-0110085 A | 9/2016 |
| KR | 10-2019-0065861 A | 6/2019 |

OTHER PUBLICATIONS

European Search Report dated Jun. 28, 2022, issued in European Patent Application No. 20849876.6.

* cited by examiner

FIG. 3

| OPERATION STATE | SPEECH RECOGNITION MODEL |
|---|---|
| FIRST MODE | FIRST SPEECH RECOGNITION MODEL |
| SECOND MODE | SECOND SPEECH RECOGNITION MODEL |
| THIRD MODE | THIRD SPEECH RECOGNITION MODEL |

FIG. 7

| OPERATION STATE | FIRST SPEECH RECOGNITION MODEL | SECOND SPEECH RECOGNITION MODEL | THIRD SPEECH RECOGNITION MODEL |
|---|---|---|---|
| OPERATION MODE | FIRST MODE | SECOND MODE | THIRD MODE |
| OPERATION INTENSITY | RPM OF MOTOR $\leq$ X1 | X1 < RPM OF MOTOR $\leq$ X2 | RPM OF MOTOR > X3 |
| OPERATING COMPONENT | MOTOR | MOTOR, FAN | MOTOR, FAN, BRUSH |
| OPERATION LOCATION | - | WALL | UNDER THE BED |

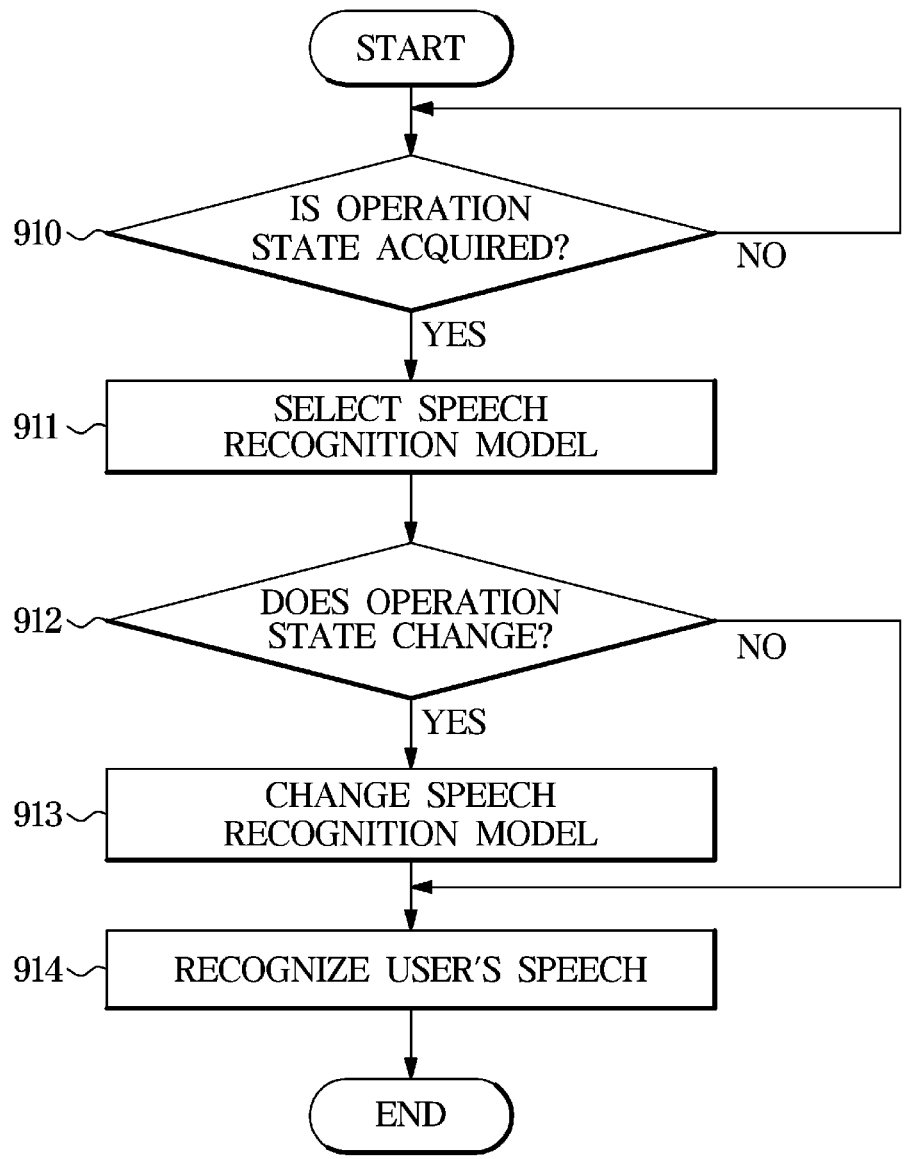

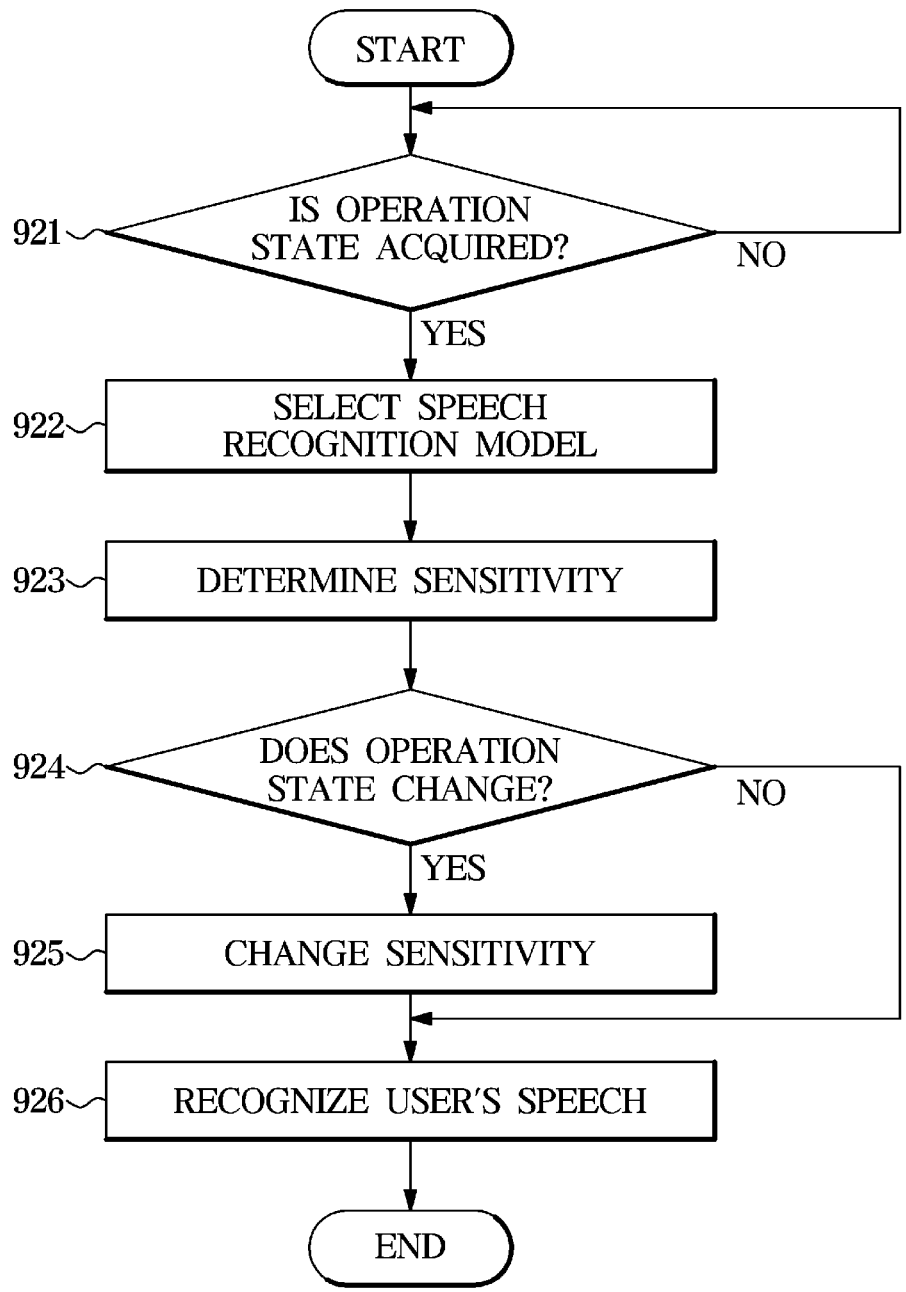

ELECTRONIC DEVICE AND METHOD FOR SPEECH RECOGNITION OF THE SAME

CROSS-REFERENCE TO RELATED APPLICATION(S)

This application is based on and claims priority under 35 U.S.C. § 119 of a Korean patent application number 10-2019-0096559, filed on Aug. 8, 2019 in the Korean Intellectual Property Office, the disclosure of which is incorporated by reference herein in its entirety.

BACKGROUND

1. Field

The disclosure relates to an electronic device capable of recognizing a user's speech and a speech recognition method thereof.

2. Description of the Related Art

Recently, to increase a user's convenience, a speech recognition service for recognizing, when a user utters his/her desired command, the user's speech and detecting the command included in the user's utterance to thereby provide a service corresponding to the user's intention has been developed and supplied.

Meanwhile, to raise a speech recognition rate and speech recognition accuracy, it is important to measure noise of an environment where the speech recognition service is provided. As noise of the environment where the speech recognition service is provided, noise generated by a device providing the speech recognition service may have great influence on speech recognition performance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure to provide an electronic device capable of recognizing a user's speech and a speech recognition method thereof.

Additional aspects will be set forth in part in the description which follows and, in part, will be apparent from the description, or may be learned by practice of the presented disclosure.

In accordance with an aspect of the disclosure, an electronic device is provided. The electronic device includes a microphone configured to receive a user's speech, a memory storing a plurality of speech recognition models, and at least one processor configured to select a speech recognition model from among the plurality of speech recognition models stored in the memory based on an operation state of the electronic device, and recognize the user's speech received by the microphone based on the selected speech recognition model.

The operation state may include at least one of an operation mode or an operation intensity of the electronic device.

The at least one processor may be further configured to select a speech recognition model corresponding to a state condition fulfilling the operation state from among a plurality of state conditions respectively matching the plurality of speech recognition models, as a speech recognition model corresponding to the operation state.

The at least one processor may be further configured to change, when the operation state changes, the selected speech recognition model based on the changed operation state, and recognize the user's speech based on the changed speech recognition model.

The at least one processor may be further configured to determine a sensitivity of the selected speech recognition model based on the operation state, and recognize the user's speech based on the selected sensitivity.

The at least one processor may be further configured to change, when the operation state changes, the sensitivity based on the changed operation state.

The at least one processor may be further configured to determine the user's intention based on a result of speech recognition on the user's speech, and change the sensitivity based on the user's intention.

The at least one processor may be further configured to determine a first pattern for noise of a surrounding environment based on the operation state, and generate a speech recognition model based on the determined first pattern.

The at least one processor may be further configured to determine a second pattern for noise of the electronic device based on the operation state, and determine the first pattern for the noise of the surrounding environment based on the second pattern.

The plurality of speech recognition models may include a plurality of speech recognition models for recognizing a wakeup word.

The electronic device may include at least one of a cleaner, an air conditioner, a refrigerator, a washing machine, or a clothes care apparatus.

In accordance with an aspect of the disclosure, an electronic device is provided. The electronic device includes a microphone configured to receive a user's speech; a transceiver configured to communicate with a server, and at least one processor configured to select a speech recognition model from among a plurality of speech recognition models received from the server based on an operation state of the electronic device, and recognize the user's speech received by the microphone based on the selected speech recognition model.

In accordance with another aspect of the disclosure, a speech recognition method of an electronic device is provided. The method includes receiving a user's speech, selecting a speech recognition model from among a plurality of speech recognition models stored in advance, based on an operation state of the electronic device, and recognizing the user's speech based on the selected speech recognition model.

The selecting of the speech recognition model may include selecting a speech recognition model corresponding to a state condition fulfilling the operation state from among a plurality of state conditions respectively matching the plurality of speech recognition models, as a speech recognition model corresponding to the operation state.

The speech recognition method may further include changing, when the operation state changes, the selected speech recognition model based on the changed operation state, wherein the recognizing of the user's speech may include recognizing the user's speech based on the changed speech recognition model.

The speech recognition method may further include determining a sensitivity of the selected speech recognition model based on the operation state, wherein the recognizing of the user's speech based on the selected speech recognition model may include recognizing the user's speech based on the determined sensitivity.

The speech recognition method may further include changing, when the operation state changes, the sensitivity of the selected speech recognition model based on the changed operation state, wherein the recognizing of the user's speech based on the selected speech recognition model may include recognizing the user's speech based on the changed sensitivity.

The speech recognition method may further include determining a user's intention based on a result of speech recognition on the user's speech, and changing the sensitivity based on the user's intention.

The speech recognition method may further include determining a first pattern for noise of a surrounding environment based on the operation state, and generating a speech recognition model based on the determined first pattern.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 shows an example of a state condition table for selecting a speech recognition model in the electronic device according to the first embodiment of the disclosure;

FIG. 7 shows an example of a state condition table for selecting a speech recognition model in the electronic device according to the second embodiment of the disclosure;

FIGS. 11, 12 and 13 are flowcharts showing speech recognition methods of an electronic device according to various embodiments of the disclosure.

Throughout the drawings, like reference numerals will be understood to refer to like parts, components, and structures.

DETAILED DESCRIPTION

Figure 1:
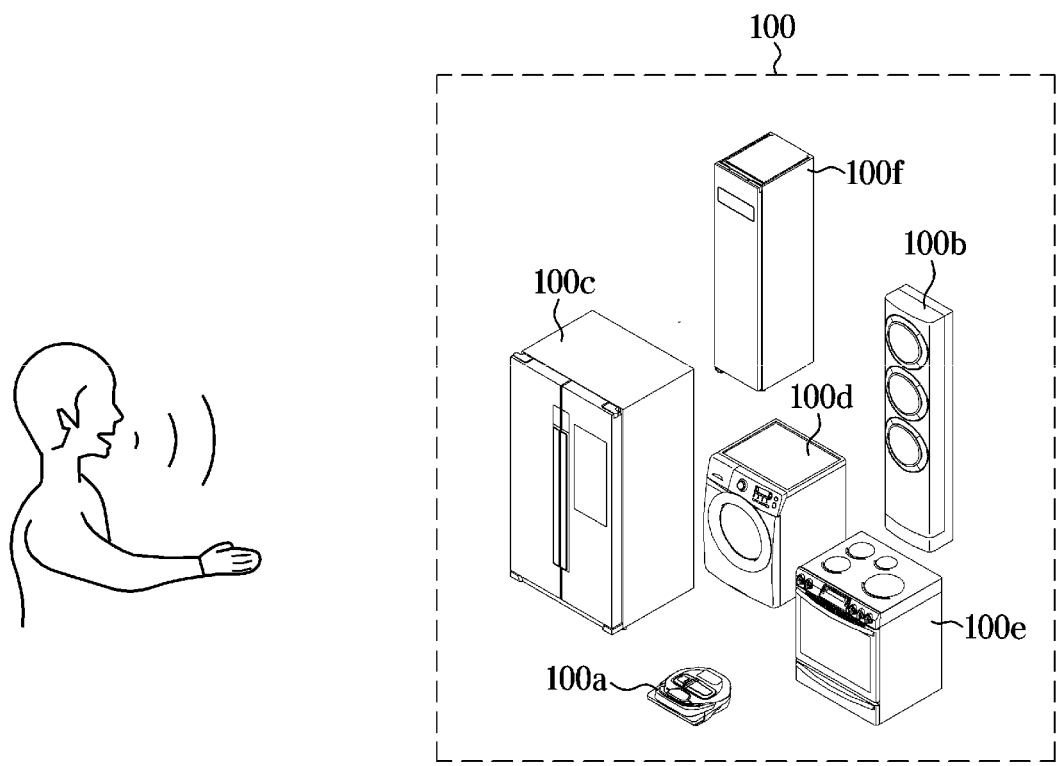
FIG. 1 shows a speech recognition system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, like reference numerals will refer to like components throughout this specification. This specification does not describe all components of the embodiments, and general information in the technical field to which the disclosure belongs or overlapping information between the embodiments will not be described. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

Also, it will be understood that when a certain part "includes" a certain component, the part does not exclude another component but can further include another component, unless the context clearly dictates otherwise.

Also, it will be understood that when the terms "includes," "comprises," "including," and/or "comprising," when used in this specification, specify the presence of a stated component, but do not preclude the presence or addition of one or more other components.

In the entire specification, it will also be understood that when a certain element is referred to as being "on" or "over" another element, it can be directly on the other element or intervening elements may also be present.

Also, it will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Throughout the disclosure, the expression "at least one of a, b or c" indicates only a, only b, only c, both a and b, both a and c, both b and c, all of a, b, and c, or variations thereof.

Hereinafter, an operation principle and embodiments of the disclosure will be described with reference to the accompanying drawings.

An electronic device according to an aspect may be a device capable of receiving sound through a microphone and transmitting and receiving data through communications with an external device. For example, the electronic device may be a home appliance, such as a robot cleaner, an air conditioner, a refrigerator, a washing machine, a clothes care apparatus, an air cleaner, a humidifier, an oven, a microwave oven, an audio system, a television (TV), a speaker, a computer, etc., or a mobile device, such as a smart phone, a tablet personal computer (PC), a PC, digital assistant (PDA), etc.

Also, the electronic device according to an aspect may perform speech recognition or provide a service provided through speech recognition, and perform machine learning or provide results of machine learning according to some embodiments. Accordingly, a cleaner, an air conditioner, a refrigerator, a TV, a speaker, etc., which is the electronic device, may also be respectively referred to as an artificial intelligence (AI) cleaner, an AI air conditioner, an AI refrigerator, an AI TV, an AI speaker, etc.

The electronic device according to an aspect may perform operations which will be described below, and have no limitation regarding its type, implementation method, name, etc.

FIG. 1 shows a speech recognition system according to an embodiment of the disclosure.

Referring to FIG. 1, a user of a speech recognition system 1 according to an embodiment of the disclosure may utter a control command for an electronic device 100 to input the control command to the electronic device 100.

The electronic device 100 may recognize the user's speech and output a response corresponding to the user's speech.

After the electronic device 100 recognizes the user's speech, the electronic device 100 may output a response corresponding to the user's intention as a response corresponding to the user's speech. At this time, the electronic device 100 may generate a control command or a conversational response corresponding to the user's intention, and output the control command or the conversational response.

Meanwhile, the electronic device 100 may be implemented as a home appliance providing various functions, such as a robot cleaner 100a, an air conditioner 100b, a refrigerator 100c, a washing machine 100d, an oven 100e, a clothes care apparatus 100f, etc.

An operation state of the electronic device 100 may be a factor influencing speech recognition performance for a user's speech. The reason may be because noise of the electronic device 100 generated according to an operation state of the electronic device 100 may act as a factor interfering with accurate speech recognition.

Also, as the electronic device 100 provides various functions, the operation state of the electronic device 100 may change in every minute. When the operation state of the electronic device 100 changes, noise generated in the electronic device 100 may also change. Accordingly, to increase the accuracy of speech recognition, a speech recognition model that responds appropriately to a change of environmental noise including noise generated in the electronic device 100 may need to be used.

Figure 2:
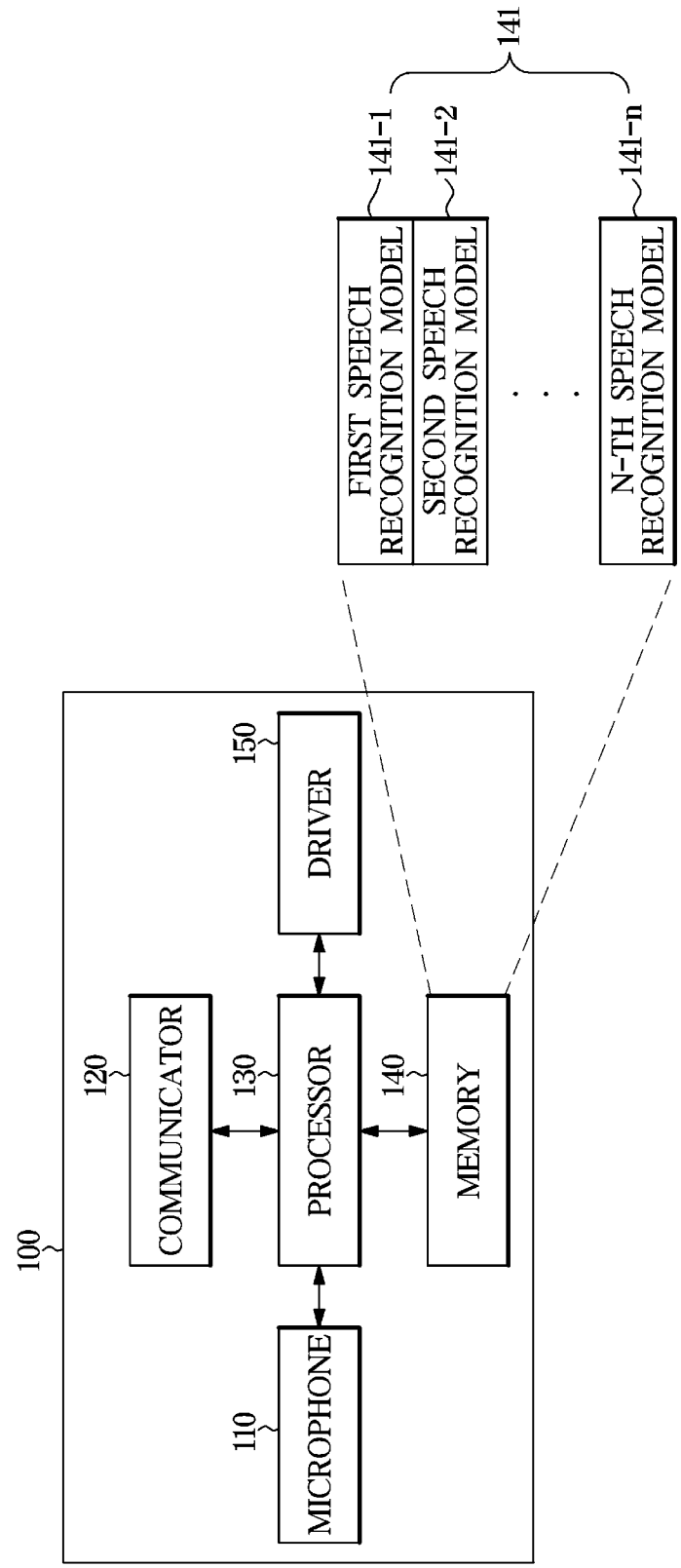
FIG. 2 is a control block diagram of an electronic device according to a first embodiment of the disclosure.

FIG. 2 is a control block diagram of an electronic device according to a first embodiment of the disclosure, and FIG. 3 shows an example of a state condition table for selecting a speech recognition model in the electronic device according to the first embodiment of the disclosure.

Referring to FIGS. 2 and 3, the electronic device 100 according to the first embodiment of the disclosure may include a microphone 110 for receiving a user's speech, a communicator or transceiver 120, a processor 130, a memory 140, and a driver 150.

The microphone 110 may receive sound and convert the sound into an electrical signal. A single microphone 110 may be provided in the electronic device 100, or a plurality of microphones 110 may be provided to increase speech recognition performance.

The microphone 110 may be mounted on an outer surface of the electronic device 100 or may be physically separated from the electronic device 100 to be positioned close to a user. For example, the microphone 110 may be implemented as a movable stand microphone, a wearable microphone such as a headset, etc. However, an installation position or implementation type of the microphone 110 is not limited as long as the microphone 110 receives a user's speech.

A speech uttered by a user may be converted into an electrical signal through the microphone 110 and input to the processor 130. Hereinafter, a speech converted into an electrical signal is also referred to as a speech signal.

The transceiver 120 may include a communication circuit for data exchange with an external device or for data exchange between components included in the electronic device 100.

The transceiver 120 may transmit/receive various information to/from a server (not shown). The transceiver 120 may receive a speech recognition model from the server (not shown) and store the received speech recognition model in the memory 140.

For this, the transceiver 120 may include at least one communication module for transmitting/receiving data according to a predefined communication standard. For example, the transceiver 120 may include at least one of a short-range communication module, a wired communication module, or a wireless communication module.

The short-range communication module may include various short-range communication modules, such as a Bluetooth module, an Infrared communication module, a Radio Frequency Identification (RFID) communication module, a Wireless Local Access Network (WLAN) communication module, a Near Field Communication (NFC) module, a Zigbee communication module, etc., to transmit/receive signals through a wireless communication network at a short distance.

The wired communication module may include various cable communication modules, such as a Universal Serial Bus (USB), a High Definition Multimedia Interface (HDMI), a Digital Visual Interface (DVI), Recommended Standard-232 (RS-232), power line communication, or a Plain Old Telephone Service (POTS), as well as various wired communication modules, such as a Controller Area Network (CAN) communication module, a Local Area Network (LAN) module, a Wide Area Network (WAN) module, or a Value Added Network (VAN) module.

The wireless communication module may include wireless communication modules supporting various wireless communication methods, such as a global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), etc., as well as a Wireless Fidelity (WiFi) module and a Wireless broadband module.

The wireless communication module may include a wireless communication interface including an antenna and a transmitter for transmitting signals. Also, the wireless communication module may further include a call conversion module for converting a digital control signal output from a processor through the wireless communication interface into an analog wireless signal, according to a control of a controller.

The wireless communication module may include a wireless communication interface including an antenna and a receiver for receiving signals. Also, the wireless communication module may further include a signal conversion module for demodulating an analog wireless signal received through the wireless communication interface into a digital control signal.

The memory 140 may store various data related to operations of the electronic device 100, and store data related to speech recognition.

The memory 140 may store a plurality of speech recognition models 141 (141-1, 141-2, . . . 141-n). The memory 140 may store the plurality of speech recognition models 141 respectively corresponding to various operation states of the electronic device 100.

The speech recognition models 141 may be received from an external server (not shown) through the transceiver 120, although not limited thereto. However, the speech recognition models 141 may have been stored in advance in the memory 140 upon design.

For this, the memory 140 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and Flash memory), a volatile memory device such as Random Access Memory (RAM), or a storage medium, such as Hard Disk Drive (HDD) and Compact Disk-Read Only Memory (CD-ROM), although not limited thereto. The memory 140 may be implemented as a chip that is separated from the processor 130 which will be described later, or the memory 140 and the processor 130 may be integrated into a single chip.

The driver 150 may include at least one component for generating a driving force for enabling the electronic device 100 to provide at least one function or transferring the driving force.

The driver 150 may include various components according to implementation examples of the electronic device 100. For example, the driver 150 may include a motor, and further include a fan according to some cases. The driver 150 will be described in detail, later.

The electronic device 100 may include the processor 130 electrically connected to the microphone 110, the transceiver 120, the memory 140, and the driver 150.

The processor 130 may recognize a user's speech received through the microphone 110.

More specifically, the processor 130 may output an utterance in a text form based on a speech signal transferred from the microphone 110 to recognize a user's speech as a sentence. For this, the processor 130 may include a speech recognition engine.

For example, the processor 130 may detect an actual speech section included in an input speech through End Point Detection (EPD), and extract a feature vector of the input speech from the detected actual speech section. At this time, the processor 130 may apply feature vector extraction technology, such as Cepstrum, Linear Predictive Coefficient (LPC), Mel Frequency Cepstral Coefficient (MFCC), or Filter Bank Energy, to the detected actual speech section to extract the feature vector of the input speech.

The processor 130 may compare the extracted feature vector to a trained reference pattern to obtain a result of recognition. For this, the processor 130 may use the speech recognition models 141 stored in the memory 140.

The speech recognition models 141 may include at least ones of acoustic models for modeling and comparing signal characteristics of a speech or language models for modeling a linguistic order relation of words, syllables, etc. corresponding to a recognition vocabulary. Alternatively, the speech recognition models 141 may be models into which acoustic models and language models are integrated.

The acoustic models may be divided into a direct comparison method of setting a recognition target to a feature vector model and comparing the feature vector model to a feature vector of speech data, and a statistical model method of statistically processing and using a feature vector of a recognition target.

The direct comparison method is a method of setting a unit, such as a word, a phoneme, etc., being a recognition target to a feature vector model and determining similarity between an input speech and the feature vector model. A representative example of the direct comparison method is a vector quantization method. The vector quantization method is a method of mapping feature vectors of input speech data to a codebook which is a reference model to encode to representative values and comparing the encoded values to each other.

The statistical model method is a method of configuring a unit for a recognition target into a state sequence and using a relation between state sequences. The state sequence may be configured with a plurality of nodes. Methods of using a relation between state sequences may include Dynamic Time Warping (DTW), Hidden Markov Model (HMM), a method using Artificial Neural Network (ANN), etc.

The Dynamic Time Warping (DTW) is a method of compensating for differences on the time axis upon comparison to a reference model in consideration of dynamic characteristics of speeches that signal lengths change over time even when the same person pronounces the same word, and the Hidden Markov Model (HMM) is recognition technology of estimating a state change probability and an observation probability of a node through learning data after assuming that a speech is a Markov process having a state change probability and an observation probability of a node (output symbol) in each state, and calculating a probability that an input speech will be generated in an estimated model.

Meanwhile, the language model for modeling a linguistic order relation of words, syllables, etc. reduces acoustic ambiguity and recognition errors by applying an order relation between units constituting a language to units obtained from speech recognition. As the language model, there are a statistical language model and a model based on Finite State Automata (FSA), and the statistical language model uses a chain probability of words, such as Unigram, Bigram, Trigram, etc.

The speech recognition model uses any method of the above-described methods for recognizing a speech. For example, the processor 130 may use a speech recognition model including an acoustic model to which a Hidden Markov Model (HMM) is applied, or a speech recognition model using a N-best search method into which an acoustic model and a language model are integrated.

Also, the processor 130 may calculate a confidence value to secure reliability of a recognition result. A confidence value is a measure representing how reliable a speech recognition result is. For example, a confidence value of a phoneme or word as a recognized result may be defined as a relative value for a probability that the corresponding phoneme or word has been uttered from different phonemes or words. Accordingly, a confidence value may be a value ranging from 0 to 1 or a value ranging from 0 to 100. When a confidence value of a recognition result exceeds a predefined threshold value, the recognition result may be output to perform an operation corresponding to the recognition result, and, when a confidence value of a recognition result is smaller than or equal to the predefined threshold value, the recognition result may be rejected.

Meanwhile, the processor 130 may recognize a predefined word. In this case, the processor 130 may determine whether a recognition result matches the predefined word. When a rate of matching between the recognition result and the predefined word is greater than or equal to a predefined reference value, the processor 130 may determine that the corresponding word has been uttered by a user.

For example, the processor 130 may recognize a predefined wakeup word. The wakeup word may be a control command for activating a speech recognition mode.

The processor 130 may recognize a wakeup word by using a pre-stored speech recognition model. In this case, the pre-stored speech recognition model may have a recognition range for recognizing a predefined word. For example, the speech recognition model may be a speech recognition model for recognizing a wakeup word.

When a recognition range is limited to a predefined wakeup word, a capacity of the memory 140 or the processor 130, required for speech recognition, may be reduced, although not limited thereto. However, the processor 130 may recognize more languages.

Also, the processor 130 may apply Natural Language Understanding (NLU) to an utterance in a text form as a recognition result to understand a user's intention included in the utterance.

The processor 130 may perform morpheme analysis on an utterance in a text form and analyze a speech-act that the utterance has. Speech-act analysis may be a task of analyzing a user's utterance intention to understand utterance intention about whether the user asks a question, whether the user makes a request, whether the user gives an answer, whether the user simply expresses emotion, etc.

The processor 130 may output a control command or a response corresponding to the user's intention understood through the morpheme analysis and speech-act analysis. The processor 130 may generate a control command for executing a service corresponding to the user's intention or output a response corresponding to the user's intention.

Meanwhile, a speech recognition model for performing an entity or a part of the above-described speech recognition process may be stored in the memory 140, and a plurality of different speech recognition models may be stored in the memory 140. The plurality of speech recognition models stored in the memory 140 may have different parameters. That is, the plurality of speech recognition models may be models modeled to perform the above-described speech recognition process by using different parameters, or models using different pieces of reference data.

The plurality of different speech recognition models may be modeled to be suitable to different environments and stored in the memory 140. Accordingly, the different speech recognition models may be applied according to environments using speech recognition to achieve a high speech recognition rate and high speech recognition accuracy. Therefore, the processor 130 may select a speech recognition model that is suitable to an environment where speech recognition is performed. Hereinafter, an operation of selecting a speech recognition model in the processor 130 will be described in detail.

The processor 130 may select a speech recognition model from among the plurality of speech recognition models stored in the memory 140, and recognize a user's speech by using the selected speech recognition model. At this time, the processor 130 may reflect a state of the electronic device 100, which may influence speech recognition, to select a speech recognition model from among the plurality of speech recognition models stored in advance.

More specifically, the processor 130 may select a speech recognition model from among the plurality of speech recognition models stored in advance, based on an operation state of the electronic device 100. Herein, the operation state of the electronic device 100 may be a state factor that may influence noise generated in the electronic device 100, that is, a state factor from which noise of the electronic device 100 may be estimated.

The operation state of the electronic device 100 may include at least one of an operation mode or an operation intensity of the electronic device 100.

The operation mode may be information representing a kind of a function provided by the electronic device 100. For example, the operation mode may be classified into a standby mode representing a state in which the electronic device 100 waits for receiving a command from a user, or an execution mode representing a state in which the electronic device 100 operates in response to an operation command received from a user. Also, the operation mode may be classified into at least one mode representing kinds of various functions provided by the electronic device 100. A volume, intensity, pattern, etc. of noise generated in the electronic device 100 may depend on the operation mode.

Meanwhile, an operation mode may be set automatically according to a control command of the processor 130, or received from a user. When an operation mode is received from a user, the electronic device 100 may further include an input device (not shown).

An operation intensity may be information representing an intensity of a driving force generated in the electronic device 100. For example, the operation intensity may be expressed as data representing an intensity of a motor, such as torque, revolution per minute (rpm), current, etc. of the motor. Also, the operation intensity may be expressed as data representing rpm of a fan. A volume, intensity, pattern, etc. of noise generated in the electronic device 100 may depend on the operation intensity.

In addition to the operation mode and the operation intensity, the operation state may further include at least one of an operating component or an operation location.

The operating component may represent a kind of a component being in an operation state among at least one component included in the electronic device 100. For example, the operating component may represent a component being in an operation state among at least one component included in the driver 150. Different components may generate noise having different volumes, intensities, patterns, etc. when operating.

The operation location may be a location of the electronic device 100, and be a location that may influence noise generated in the electronic device 100. The operation location may be classified according to predefined areas. For example, the operation location may be classified into under the bed, near the wall, carpet, etc. A waveform of noise generated upon operation may depend on the operation location, and accordingly, a volume, intensity, pattern, etc. of noise may change according to the operation location.

Based on the operation state described above, the processor 130 may select a speech recognition model corresponding to the operation state from among the plurality of speech recognition models. That is, the processor 130 may select a speech recognition model capable of securing a high speech recognition rate and high recognition performance according to the operation state of the electronic device 100.

More specifically, the processor 130 may identify a state condition fulfilling the operation state from among predefined state conditions for the plurality of speech recognition models, and select a speech recognition model corresponding to the state condition fulfilling the operation state, as a speech recognition model corresponding to the operation state. The predefined state conditions for the plurality of speech recognition models may be conditions for operation states, and may be defined upon design or according to a user's input.

For this, a state condition table in which state conditions for operation states match speech recognition models may be stored in the memory 140. The processor 130 may compare the operation state of the electronic device 100 to the state condition table to determine a speech recognition model corresponding to the operation state.

For example, as shown in FIG. 3, the state conditions may be defined in advance as conditions for operation modes among operation states, and a state condition table in which speech recognition models match operation modes may be stored in the memory 140.

In this case, a first speech recognition model, a second speech recognition model, and a third speech recognition model stored in the memory 140 may be models modeled to have different speech recognition parameters.

When an operation mode of the electronic device 100 is a first mode, the processor 130 may select the first speech recognition model from among the plurality of speech recognition models. Likewise, according to the example of FIG. 3, when an operation mode of the electronic device 100 is a second mode, the processor 130 may select the second speech recognition model, and, when an operation mode of the electronic device 100 is a third mode, the processor 130 may select the third speech recognition model.

As such, by selecting a speech recognition model that is suitable to a noise environment according to an operation state of the electronic device 100 instead of unconditionally using a speech recognition model modeled in a normal environment, the processor 130 may raise a speech recognition rate and speech recognition accuracy.

Particularly, when a speech recognition model is a wakeup word recognition model, a wakeup word may be accurately recognized despite noise of the electronic device 100. Accordingly, the wakeup word may be recognized quickly and accurately although the user does not again utter the wakeup word.

Meanwhile, when the operation state of the electronic device 100 changes, noise generated in the electronic device 100 may also change.

When the operation state of the electronic device 100 changes, the processor 130 may change the selected speech recognition model based on the changed operation state, and recognize a user's speech based on the changed speech recognition model. For this, the processor 130 may acquire an operation state in real time or at predefined time intervals.

For example, according to the example of FIG. 3, when the first mode changes to the second mode, the processor 130 may change the first speech recognition mode to the second speech recognition mode. Thereafter, when the second mode changes to the third mode, the processor 130 may change the second speech recognition model to the third speech recognition model, and perform speech recognition by using the third speech recognition model.

By changing a speech recognition model according to an operation state of the electronic device 100, the processor 130 may increase accuracy and efficiency of speech recognition.

The processor 130 may determine a parameter of a speech recognition model based on an operation state, and perform speech recognition based on the determined parameter. The parameter of the speech recognition model may include a sensitivity, and may include various speech recognition-related parameters in addition to a sensitivity. Hereinafter, as an example of a parameter of a speech recognition model, a sensitivity will be described.

The processor 130 may identify a state condition fulfilling an operation state from among predefined conditions for operation states for sensitivities, and determine a sensitivity corresponding to the state condition fulfilling the operation state as a sensitivity of a speech recognition model.

For this, a sensitivity table in which sensitivities of speech recognition models match operation states may be stored in the memory 140. The processor 130 may compare an operation state of the electronic device 100 to the sensitivity table to determine a sensitivity of a speech recognition model corresponding to the operation state.

Sensitivities may be classified into a plurality of predefined levels that are different according to the speech recognition models. The processor 130 may determine a sensitivity level corresponding to an operation state.

For example, when the electronic device 100 is in the first mode, the processor 130 may determine a sensitivity of a selected speech recognition model to be a first level. When the electronic device 100 is in the second mode in which a greater volume of noise is generated than that of the first mode, the processor 130 may determine a sensitivity of a speech recognition model to be a second level. Herein, the second level may have a higher sensitivity than the first level.

In this way, because the processor 130 determines a sensitivity of a speech recognition model according to an operation state, the processor 130 may reduce influence by noise of the electronic device 100. Accordingly, accuracy and efficiency of speech recognition may increase.

Meanwhile, when the operation state of the electronic device 100 changes, noise generated in the electronic device 100 may also change. Accordingly, a case in which a sensitivity of a speech recognition model needs to change may occur.

When an operation state changes, the processor 130 may change a sensitivity based on the changed operation state, and recognize a user's speech based on the changed sensitivity. For this, the processor 130 may acquire an operation state in real time or at predefined time intervals.

Operation of changing a sensitivity of a speech recognition model may be performed simultaneously with operation of changing a speech recognition model. That is, when an operation state changes, the processor 130 may change a speech recognition model and a sensitivity of the speech recognition model based on the changed operation state, although not limited thereto. However, the processor 130 may change a sensitivity of a speech recognition mode, without changing the speech recognition model.

Meanwhile, a sensitivity of a speech recognition model may change according to a user's intention, instead of an operation state.

The processor 130 may determine a user's intention based on a result of speech recognition on the user's speech, and change a sensitivity based on the user's intention.

More specifically, the processor 130 may understand context based on a result of speech recognition, understand a user's intention about whether the user will continue to utter or finish uttering according to the context, and change a sensitivity based on the user's intention.

For example, when the processor 130 determines that a user will continue to utter based on a result of speech recognition on the user's speech, the processor 130 may change a sensitivity to a higher sensitivity. When the processor 130 determines that a user will finish uttering based on a result of speech recognition on the user's speech, the processor 130 may change a sensitivity to a lower sensitivity.

In this way, because a sensitivity of a speech recognition model changes according to a user's intention, an accurate speech recognition service may be provided in various environments where speech recognition is used.

Particularly, upon wakeup word recognition, because a sensitivity changes according to a user's intention after the user utters the wakeup word, more accurate speech recognition may be possible. Accordingly, user convenience may increase.

Meanwhile, the processor 130 may generate a speech recognition model for noise of a surrounding environment based on an operation state, and store the speech recognition model in the memory 140 or the server (not shown).

The processor 130 may determine a first pattern for noise of a surrounding environment based on an operation state, and generate a speech recognition model based on the first pattern. The noise of the surrounding environment may be noise excluding noise of the electronic device 200 among noise input to the microphone 110.

More specifically, the processor 130 may determine a second pattern for noise of the electronic device 100, that is, noise generated in the electronic device 100, based on an operation state, and determine a first pattern for noise of a surrounding environment based on the second pattern.

For this, noise patterns according to operation states may be stored in the memory 140 or the server (not shown). The processor 130 may determine a noise pattern corresponding to an operation state among noise patterns stored in the memory 140 or the server (not shown) to be a second pattern for noise of the electronic device 100.

The processor 130 may determine noise excluding noise of the electronic device 100 of the second pattern among noise input to the microphone 110 to be noise of a surrounding environment, and extract a first pattern for the noise of the surrounding environment based on signal characteristics of the determined noise of the surrounding environment.

The processor 130 may generate a speech recognition model based on the first pattern for the noise of the surrounding environment.

Also, the processor 130 may change at least one of a pre-selected speech recognition model or a sensitivity of the speech recognition model based on the first pattern for the noise of the surrounding environment.

Thereby, accurate and efficient speech recognition may be possible despite noise of a surrounding environment as well as noise generated in the electronic device. Accordingly, user convenience may increase.

Meanwhile, data for an algorithm for controlling operations of components in the electronic device 100 or a program for embodying the algorithm may be stored in the memory 140. The processor 130 may perform the above-described operations by using the data stored in the memory 140. The memory 140 and the processor 130 may be implemented as separate chips or integrated into a single chip.

At least one component may be added or omitted to correspond to performance of the components of the electronic device 100 shown in FIG. 2. Also, it will be easily understood by one of ordinary skill in the art that relative positions of the components may change to correspond to the performance or structure of the system.

Meanwhile, the components shown in FIG. 2 may be software components and/or hardware components, such as a Field Programmable Gate Array (FPGA) and an Application Specific Integrated Circuit (ASIC).

Hereinafter, an implementation example of the electronic device 100 will be described with reference to FIGS. 4 to 7.

Figure 4:
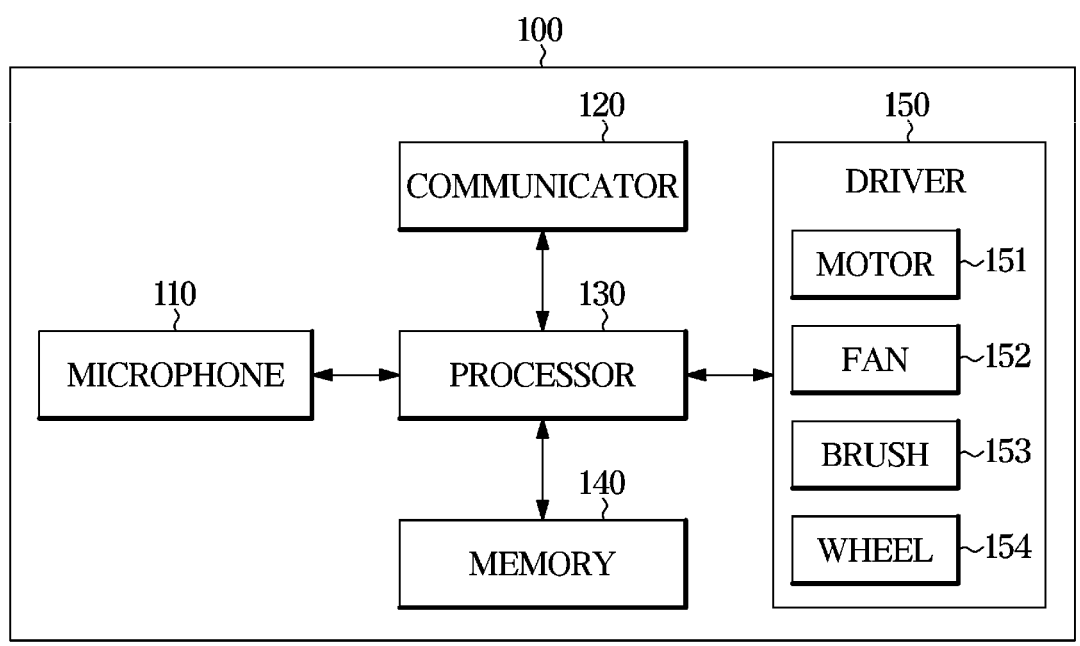
FIG. 4 is a control block diagram of an electronic device according to a second embodiment of the disclosure.
Figure 5:
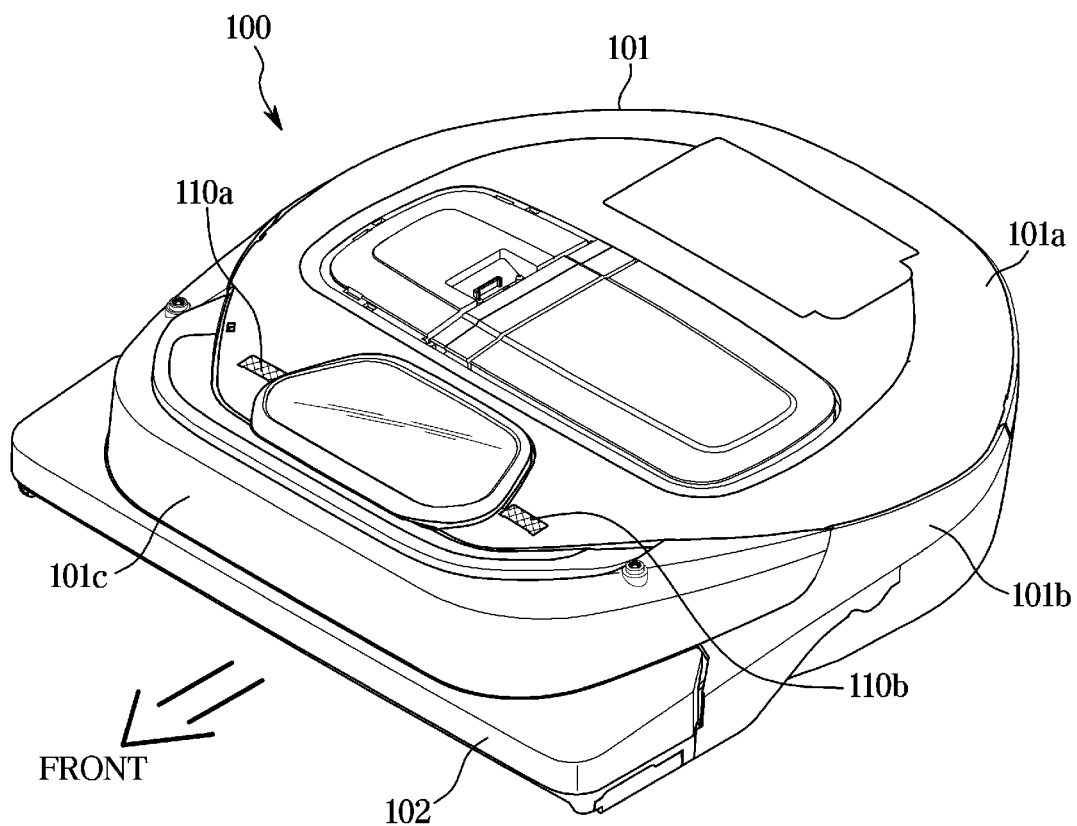
FIG. 5 shows an outer appearance of a robot cleaner as an implementation example of the electronic device according to the second embodiment of the disclosure.
Figure 6:
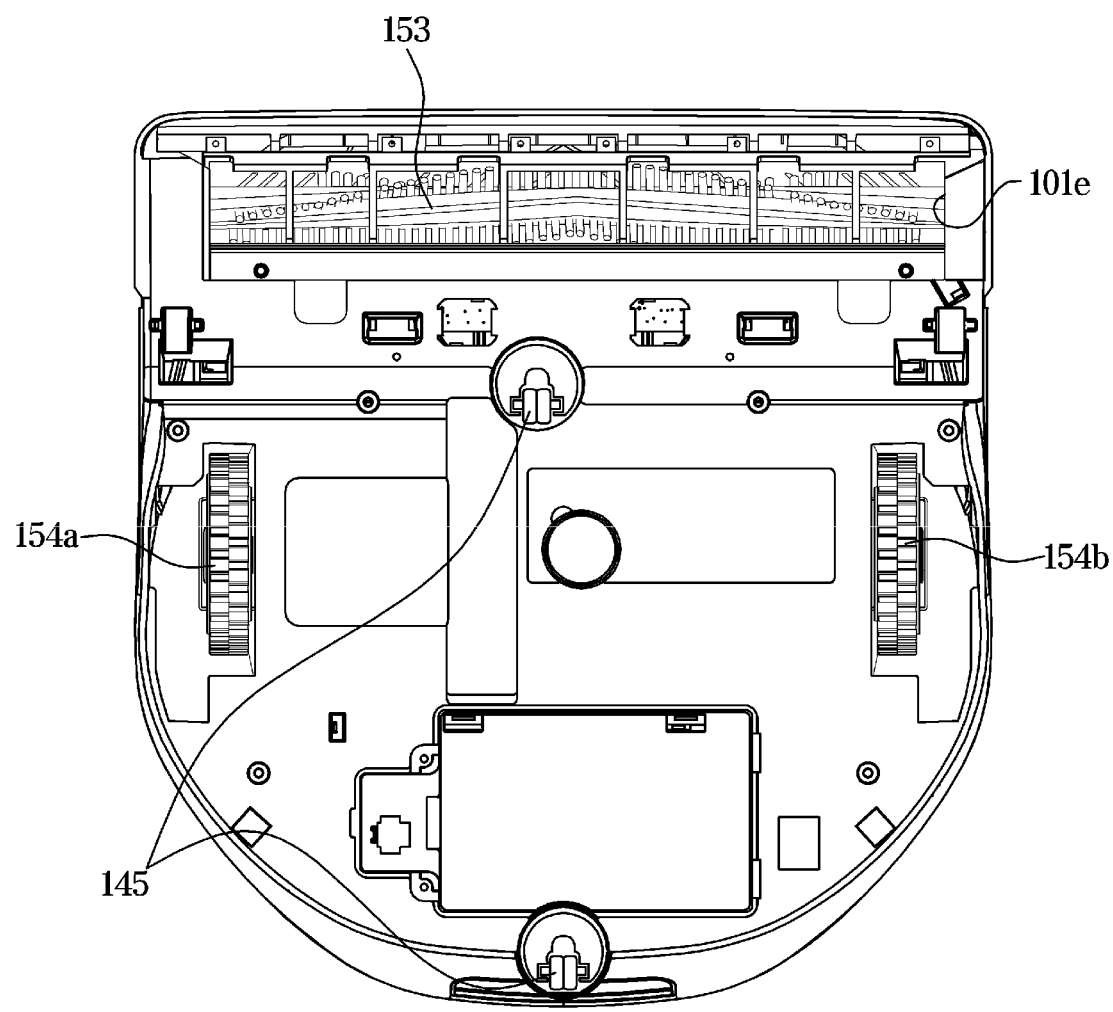
FIG. 6 shows a bottom of the robot cleaner as the implementation example of the electronic device according to the second embodiment of the disclosure.

FIG. 4 is a control block diagram of an electronic device according to a second embodiment of the disclosure, FIG. 5 shows an outer appearance of a robot cleaner as an implementation example of the electronic device according to the second embodiment of the disclosure, FIG. 6 shows a bottom of the robot cleaner as the implementation example of the electronic device according to the second embodiment of the disclosure, and FIG. 7 shows an example of a state condition table for selecting a speech recognition model in the electronic device according to the second embodiment of the disclosure.

Referring to FIGS. 4, 5, and 6, the electronic device 100 according to the second embodiment of the disclosure may be implemented as a robot cleaner including a main body 101, and a bumper 102 positioned in a front side of the main body 101.

As shown in FIG. 4, the electronic device 100 according to the second embodiment of the disclosure may include the microphone 110, the transceiver 120, the processor 130, the memory 140, and the driver 150.

The microphone 110, the transceiver 120, the processor 130, and the memory 140 have been described above with reference to FIG. 2, and the driver 150 may include an internal component of the robot cleaner. Hereinafter, features of the second embodiment, which are different from those of the first embodiment, will be described.

The main body 101 of the electronic device 100 implemented as the robot cleaner according to the second embodiment of the disclosure may be substantially in a shape of a cylinder, as shown in FIG. 5. More specifically, the main body 101 may include a top surface 101a formed substantially in a shape of a circle, and a side surface 101b formed along an edge of the top surface 101a.

A plurality of microphones 110a and 110b may be positioned on the top surface 101a, although not limited thereto. However, the microphone 110 may be positioned on at least one of the bumper 102, a front surface 101c, the side surface 101b, or a bottom (see FIG. 6).

The bumper 102 may reduce an impact transferred to the main body 101 upon a collision with an obstacle, and sense a collision with an obstacle. The obstacle may be an object, a person, or an animal that interferes with traveling of the electronic device 100. The obstacle may include a wall partitioning a cleaning space, furniture positioned in a cleaning space, and a person or animal located in a cleaning space.

When the electronic device 100 travels, the bumper 102 may face in a front direction, and a direction in which the bumper 102 faces may be defined as a 'front' direction of the electronic device 100, as shown in FIG. 5.

Inside and outside the main body 101 of the electronic device 100, components for performing functions (moving and cleaning) of the robot cleaner may be provided, and the components may be included in the driver 150.

As shown in FIG. 4, the driver 150 may include a motor 151, a fan 152, a brush 153, and a wheel 154.

The motor 151 may generate a driving force, and transfer the generated driving force to at least one of the fan 152, the brush 153, or the wheel 154. For this, a plurality of motors 151 may be provided to generate and transfer driving forces independently for the fan 152, the brush 153, and the wheel 154, respectively.

The wheel 154 may include a first wheel 154*a* positioned on a left side of the bottom of the electronic device 100 and a second wheel 154*b* positioned on a right side of the bottom of the electronic device 100, and rotate by the motor 151 to move the main body 101.

When the main body 101 moves, a rotation shaft of a roller 145 may rotate, and accordingly, the roller 145 may support the main body 101 without interfering with traveling of the electronic device 100.

Also, the electronic device 100 may include a driving circuit for supplying driving current to the motor 151, and a rotation sensor (for example, an encoder, a hall sensor, etc.) for sensing rotations of the wheel 154.

The brush 153 may be positioned in a dust suction port 101*e* formed in the bottom of the main body 101, as shown in FIG. 6. The brush 153 may rotate on a rotation shaft positioned to be horizontal to a floor of a cleaning space to scatter dust gathered on the floor to inside of the dust suction port 101*e*.

Also, the electronic device 100 may include various sensors for acquiring at least one of an operation mode, an operation intensity, an operating component, or an operation location.

As such various components operate in different operation states, characteristics of noise generated in the electronic device 100 may also change accordingly.

Accordingly, the processor 130 may select a speech recognition model capable of securing a high recognition rate and high recognition performance according to an operation state of the electronic device 100, and perform speech recognition based on the selected speech recognition model. This operation has been described above in the first embodiment, and state conditions for operation states may be modified appropriately according to an implementation example of the electronic device 100.

Referring to FIG. 7, state conditions may have been defined in advance as conditions for an operation mode, an operation intensity, an operating component, and an operation location among operation states, and a state condition table in which speech recognition models match operation modes may be stored in the memory 140.

A first speech recognition model, a second speech recognition model, and a third speech recognition model stored in the memory 140 may be models modeled to have different speech recognition parameters.

The operation mode may be classified according to functions of the robot cleaner, and the operation intensity may be represented as at least one value of rpm of the motor 151, torque of the motor 151, a magnitude of driving current provided to the motor 151, strength of the fan 152, or rpm of the fan 152.

When an operation mode of the electronic device 100 is the first mode, rpm of the motor 151 is smaller than or equal to a first threshold value X1, and an operating component is the motor 151, the processor 130 may select the first speech recognition model from among the plurality of speech recognition models.

When an operation mode of the electronic device 100 is the second mode, rpm of the motor 151 is greater than the first threshold value X1 and smaller than or equal to a second threshold value X2, operating components are the motor 151 and the fan 152, and an operation location is near the wall, the processor 130 may select the second speech recognition model.

When an operation mode of the electronic device 100 is the third mode, rpm of the motor 151 is greater than a third threshold value X3, and operating components are the motor 151, the fan 152 and the brush 153, and an operation location is under the bed, the processor 130 may select the third speech recognition model.

As such, by selecting a speech recognition model that is suitable to a noise environment according to a detailed operation state of the electronic device 100 instead of unconditionally using a speech recognition model modeled in a normal environment, the processor 130 may raise a speech recognition rate and speech recognition accuracy.

Particularly, when a speech recognition model is a wakeup word recognition model, a wakeup word may be accurately recognized despite noise of the electronic device 100. Accordingly, the wakeup word may be recognized quickly and accurately although the user does not again utter the wakeup word.

Like the first embodiment of the disclosure, the processor 130 according to the second embodiment of the disclosure may determine a sensitivity of a speech recognition model according to an operation state including at least one of an operation mode, an operation intensity, an operating component, or an operation location, and change at least one of the speech recognition model or the sensitivity of the speech recognition model according to a change of the operation state. Also, the processor 130 may change the sensitivity based on a user's intention or generate a speech recognition model for noise of a surrounding environment based on an operation state. This operation has been described above in the first embodiment, and therefore, further descriptions thereof will be omitted.

Hereinafter, another implementation example of the electronic device 100 will be described with reference to FIGS. 8 to 10.

Figure 8:
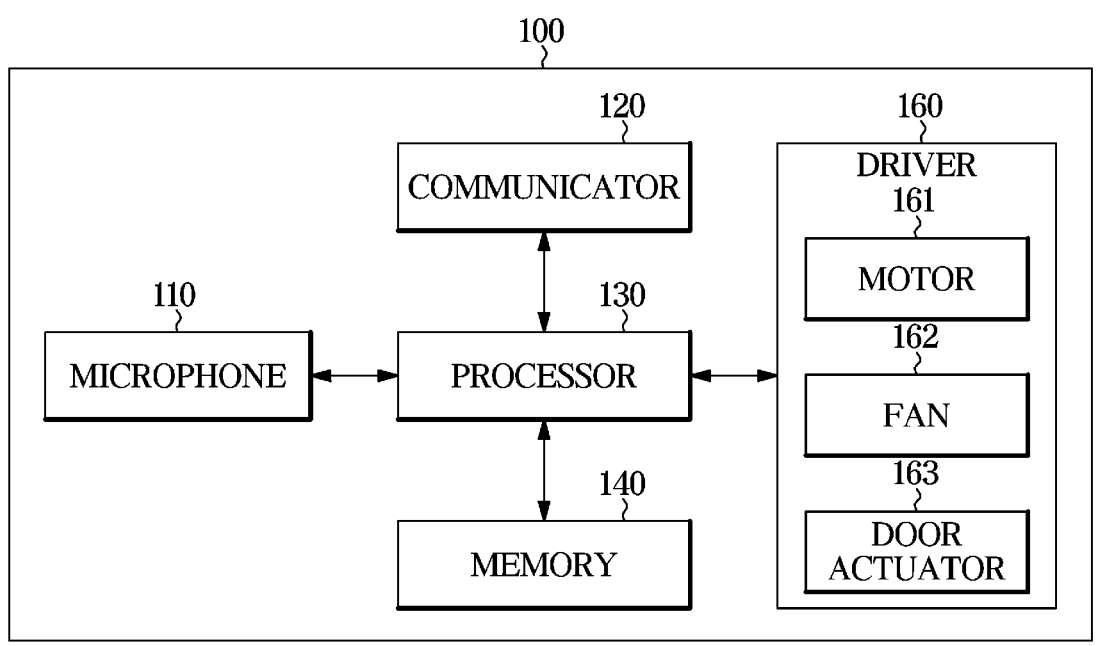
FIG. 8 is a control block diagram of an electronic device according to a third embodiment of the disclosure.

FIG. 8 is a control block diagram of an electronic device according to a third embodiment of the disclosure. FIG. 9 shows an outer appearance of an air conditioner as an implementation example of the electronic device according to the third embodiment of the disclosure, and FIG. 10 is an exploded perspective view of the air conditioner as the implementation example of the electronic device according to the third embodiment of the disclosure.

Figure 9:
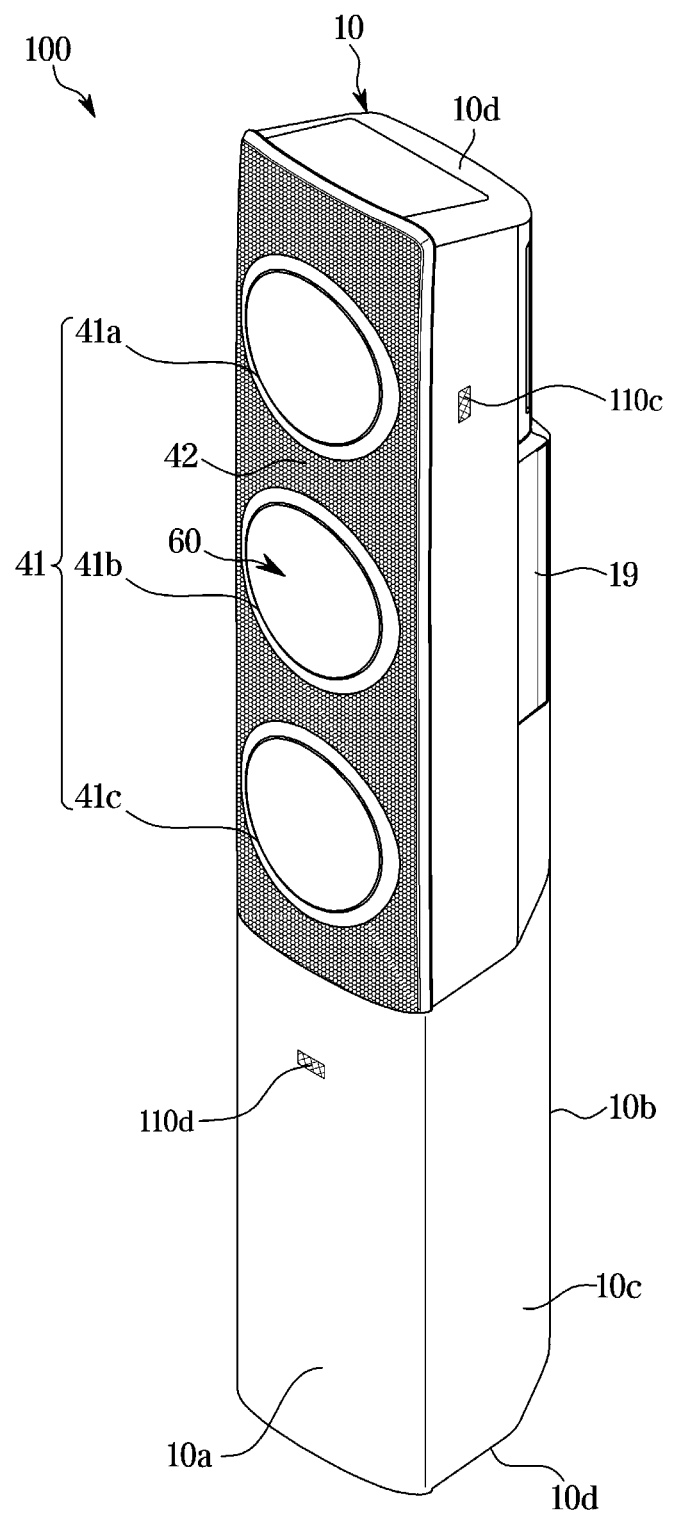
FIG. 9 shows an outer appearance of an air conditioner as an implementation example of the electronic device according to the third embodiment of the disclosure.
Figure 10:
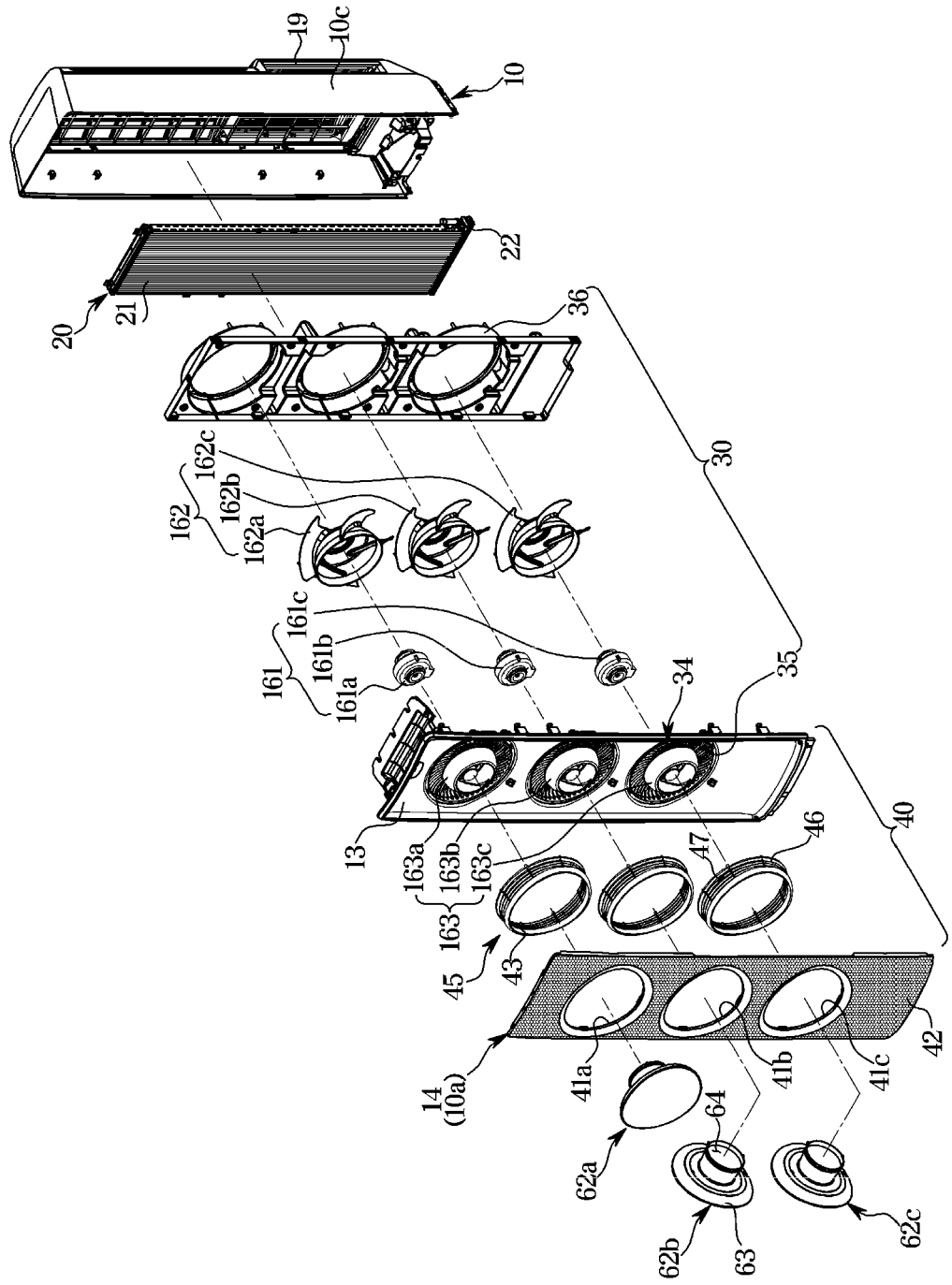
FIG. 10 is an exploded perspective view of the air conditioner as the implementation example of the electronic device according to the third embodiment of the disclosure.

Referring to FIGS. 8, 9, and 10, the electronic device 100 according to the third embodiment of the disclosure may be implemented as an air conditioner including a housing 10 having at least one outlet opening 41 (41*a*, 41*b*, 41*c*), a heat exchanger 20 for exchanging heat with air entered inside of the housing 10, a blower 30 for circulating air to the inside or outside of the housing 10, and an outlet 40 for discharging air blown from the blower 30 to the outside of the housing 10.

As shown in FIG. 8, the electronic device 100 according to the third embodiment of the disclosure may include the microphone 110, the transceiver 120, the processor 130, the memory 140, and a driver 160.

The microphone 110, the transceiver 120, the processor 130, and the memory 140 have been described above with reference to FIG. 2, and the driver 160 may include an internal component of the air conditioner. Hereinafter, features of the third embodiment, which are different from those of the first embodiment, will be described.

The housing 10 of the electronic device 100 implemented as the air conditioner according to the third embodiment of the disclosure may include, as shown in FIG. 9, a front panel 10a in which the at least one outlet opening 41 (41a, 41b, 41c) is formed, a rear panel 10b positioned behind the front panel 10a, side panels 10c positioned between the front panel 10a and the rear panel 10b, and top and bottom panels 10d positioned above and below the side panels 10c. The at least one outlet opening 41 may be in a shape of a circle, and at least two or more outlet openings 41 may be provided in an up-down direction of the front panel 14 (or 10a shown in FIG. 9) in such a way to be spaced from each other. For example, the outlet openings 41 may include a first outlet opening 41a, a second outlet opening 41b, and a third outlet opening 41c. A plurality of outlet holes 42 may be provided in a part of the front panel 10a.

In each of the front panel 10a and the side panels 10c, a first microphone 110d may be positioned, although not limited thereto. However, the microphone 110 may be positioned in at least one of the top and bottom panels 10d or the rear panel 10d. Also, the microphone 110 may be positioned at an appropriate location for receiving a user's speech.

In the rear panel 10b, a suction port 19 may be formed to suck outside air to the inside of the housing 10.

The suction port 19 may be positioned in the rear panel 10b positioned behind the heat exchanger 20 to guide outside air of the housing 10 to enter the inside of the housing 10. Air entered the inside of the housing 10 through the suction port 19 may pass through the heat exchanger 20 to absorb or lose heat. Air exchanged heat by passing through the heat exchanger 20 may be discharged to the outside of the housing 10 by the blower 30 via the outlet port 40.

The blower 30 may include a fan 162, and a grille 34 positioned in a protruding direction of the fan 162. According to some embodiments, the fan 162 may be positioned to correspond to the at least one outlet opening 41, and the number of the fan 162 is not limited. For example, the fan 162 may include a first fan 162a, a second fan 162b, and a third fan 162c.

The blower 30 may include a motor 161 positioned at a center of the fan 162 to drive the fan 162. For example, the motor 161 may include a first fan motor 161a for driving the first fan 162a, a second fan motor 161b for driving the second fan 162b, and a third fan motor 161c for driving the third fan 162c. The motor 161 may rotate the fan 162, and the rotating fan 162 may generate a flow of air passing through the heat exchanger 20.

The grille 34 may include a plurality of blades 35. By adjusting the number, shape, and installation angle of the plurality of blades 35, a direction or amount of air that is blown from the fan 162 to the outlet opening 41 may be adjusted.

At a center of the grille 34, a door actuator 163 may be positioned. The door actuator 163 and the motor 161 may be aligned in a front-back direction. Through the configuration, the plurality of blades 35 of the grille 34 may be positioned in front of fan blades of the fan 162.

The blower 30 may include a duct 36. The duct 36 may be in a shape of a circle surrounding the fan 162 to guide a flow of air flowing to the fan 162.

The heat exchanger 20 may be positioned between the fan 162 and the suction port 19 to absorb heat from air entered through the suction port 19 or transfer heat to air entered through the suction port 19. The heat exchanger 20 may include a tube 21, and a header 22 coupled to upper and lower ends of the tube 21. However, a kind of the heat exchanger 20 is not limited.

In the inside and outside of the housing 10 of the electronic device 100, components for performing functions of the air conditioner, such as blowing, temperature adjustment, air purification, etc., may be provided, and the components may be included in the driver 160.

The outlet opening 41 may be opened and closed by a door 60, and may include a door blade 62 (62a, 62b or 62c). The door actuator 163 may operate the door blade 62 to open or close the door 60. The door actuator 163 may cause the door blade 62 to be spaced from an end 43 of a discharge guide 45 to open the door 60, and cause the door blade 62 from being in contact with the end 43 of the discharge guide 45 to close the door 60.

The discharge guide element 45 may include a guide body 46 and a guide hole 47. The guide body 46 may form the first discharge path thereinside. The guide body 46 may be in the shape of a cylinder having a hollow interior. More specifically, the guide body 46 may be in the shape of a pipe whose one end faces the blower unit 30 and whose other end faces the outlet 41. The guide hole 47 may pass the second discharge path therethrough. The guide hole 47 may be formed in the guide body 46. The shape of the guide hole 47 may be not limited, and the guide hole 47 may have any structure that can be formed in the guide body 46 and enable air to flow in the outside direction of the guide body 46. In the current embodiment, the guide hole 47 may be a plurality of holes formed along the circumference of the guide body 46.

The door blade 62 may include a blade body 63 being in a shape of a circle to correspond to the outlet opening 41, and a blade coupling portion 64 extending from the blade body 63 and coupled to the door actuator 163.

The driver 160 may include the motor 161, the fan 162, and the door actuator 163.

In addition, the electronic device 100 may include a driving circuit for supplying driving current to the motor 161 and a rotation sensor (for example, an encoder, a hall sensor, etc.) for sensing rotations of the fan 162, and may include various sensors for acquiring at least one of an operation mode, an operation intensity, an operating component, or an operation location.

As such various components operate in different operation states, characteristics of noise generated in the electronic device 100 may also change accordingly.

Accordingly, the processor 130 may determine a sensitivity of a speech recognition model capable of securing a high recognition rate and high recognition performance according to an operation state of the electronic device 100, and perform speech recognition based on the determined sensitivity. This operation has been described above in the first embodiment, and detailed conditions for operation states according to sensitivities may be modified appropriately according to an implementation example of the electronic device 100.

For example, conditions for operation states according to sensitivities may be set to conditions for operation modes, and the operation modes of the air conditioner may be classified into a first mode which is a mild wind mode and a second mode which is a strong wind mode. In this case, the processor 130 may determine, in the first mode, a sensitivity of a speech recognition model to be a first level, and may determine, in the second mode, a sensitivity of a speech recognition model to be a second level having a higher sensitivity than the first level.

Also, the conditions for operation states according to sensitivities may be set to conditions for at least one of an operation mode, an operation intensity, an operating component, or an operation location of an air conditioner. The processor 130 may identify a state condition fulfilling an operation state among predefined conditions for operation states according to sensitivities, and determine a sensitivity corresponding to the state condition fulfilling the operation state to be a sensitivity of a speech recognition model.

For this, a sensitivity table in which sensitivities for speech recognition models match operation states may be stored in the memory 140. The processor 130 may compare an operation state of the electronic device 100 to the sensitivity table to determine a sensitivity of a speech recognition model corresponding to the operation state.

In this way, by determining a sensitivity of a speech recognition model according to an operation state, the processor 130 may reduce influence by noise of the electronic device 100. Accordingly, accuracy and efficiency of speech recognition may increase.

Particularly, when a speech recognition model is a wakeup word recognition model, a wakeup word may be accurately recognized through sensitivity adjustment despite noise of the electronic device 100. Accordingly, the wakeup word may be recognized quickly and accurately although the user does not again utter the wakeup word.

Like the first embodiment of the disclosure, the processor 130 according to the third embodiment of the disclosure may change, when an operation state changes, a sensitivity based on the changed operation state, and recognize a user's speech based on the changed sensitivity. For this, the processor 30 may acquire an operation state in real time or at predefined time intervals. Also, the processor 130 may change a sensitivity of a speech recognition model according to a user's intention in addition to an operation state, and generate a speech recognition model for a noise of a surrounding environment based on the operation state. This operation has been described above in the first embodiment, and therefore, further descriptions thereof will be omitted.

At least one component may be added or omitted to correspond to performance of the components of the electronic device 100 shown in FIGS. 4 and 8. Also, it will be easily understood by one of ordinary skill in the art that relative positions of the components may change to correspond to the performance or structure of the system.

Meanwhile, the components shown in FIGS. 4 and 8 may be software components and/or hardware components, such as a FPGA and an ASIC.

Figure 11:
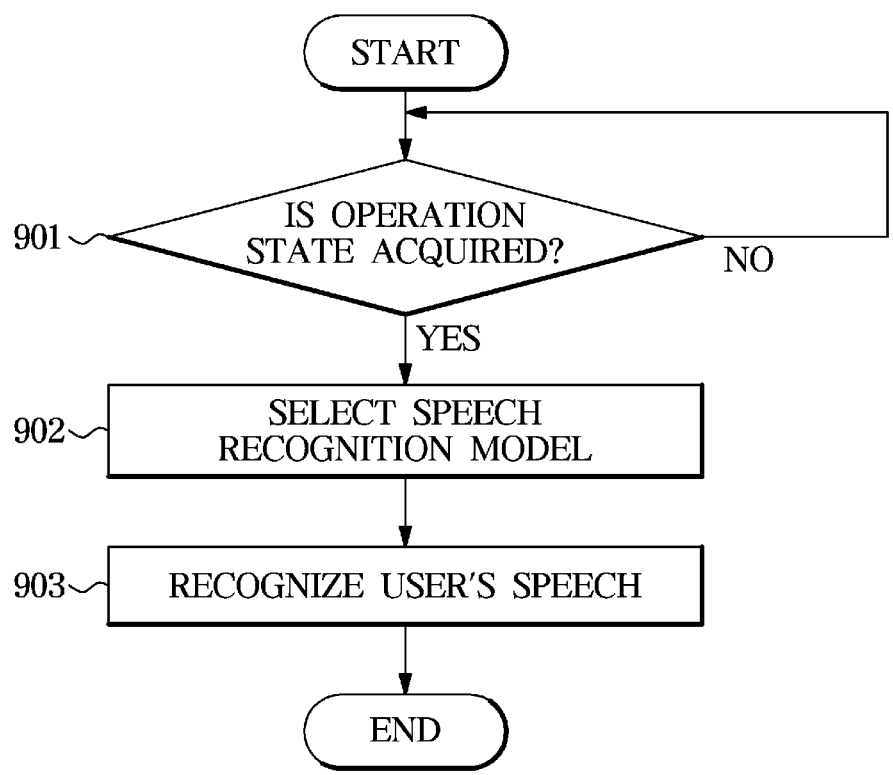

FIG. 11 is a flowchart showing a speech recognition method of an electronic device according to an embodiment of the disclosure.

Referring to FIG. 11, the electronic device 100 according to an embodiment of the disclosure may determine whether an operation state is acquired, in operation 901. Herein, the operation state of the electronic device 100 may be a state factor that may influence noise generated in the electronic device 100, that is, a state factor from which noise of the electronic device 100 may be estimated. The operation state may include at least one of an operation mode, an operation intensity, an operating component, or an operation location of the electronic device 100.

After the operation state is acquired (YES in operation 901), the electronic device 100 may select a speech recognition model based on the operation state, in operation 902.

More specifically, the electronic device 100 may select a speech recognition model based on the operation state from among a plurality of speech recognition models stored in advance in the memory 140 or a server (not shown).

The electronic device 100 may identify a state condition fulfilling the operation state from among predefined state conditions respectively for the plurality of speech recognition models, and select a speech recognition model corresponding to the state condition fulfilling the operation state as a speech recognition model corresponding to the operation state. At this time, a state condition for each of the plurality of speech recognition models may be defined as a condition for an operation state upon design or according to a user's input.

For this, a state condition table in which state conditions for operation states match speech recognition models may be stored in the memory 140. The electronic device 100 may compare the acquired operation state to the state condition table to determine a speech recognition model corresponding to the operation state.

By selecting the speech recognition model corresponding to the acquired operation state from among the speech recognition models for the operation states, the electronic device 100 may recognize a user's speech based on the selected speech recognition model, in operation 903.

As such, by selecting a speech recognition model that is suitable to a noise environment according to an operation state of the electronic device 100 instead of unconditionally using a speech recognition model modeled in a normal environment, and using the speech recognition model for speech recognition, a speech recognition rate and speech recognition accuracy may increase.

Particularly, when a speech recognition model is a wakeup word recognition model, a wakeup word may be accurately recognized despite noise of the electronic device 100. Accordingly, the wakeup word may be recognized quickly and accurately although the user does not again utter the wakeup word.

FIG. 12 is a flowchart showing a speech recognition method of an electronic device according to an embodiment of the disclosure.

Referring to FIG. 12, the electronic device 100 according to an embodiment of the disclosure may acquire an operation state, and after the operation state is acquired (YES in operation 910), the electronic device 100 may select a speech recognition model based on the operation state, in operation 911. Operations 910 and 911 may be the same as operations 901 and 902 of FIG. 11.

Then, the electronic device 100 may determine whether the operation state changes, in operation 912. The electronic device 100 may check the operation state in real time or at predefined time intervals.

When the operation state changes (YES in operation 912), the electronic device 100 may change a speech recognition model to a speech recognition model corresponding to the changed operation state, in operation 913. That is, the electronic device 100 may reselect a speech recognition model based on the changed operation state.

The electronic device 100 may recognize a user's speech based on the changed speech recognition model, in operation 914.

Thereby, because a speech recognition model changes according to an operation state of the electronic device 100, a speech recognition model that is suitable to a noise environment according to the operation state of the electronic device 100 may be used. Accordingly, accuracy and efficiency of speech recognition may increase.

FIG. 13 is a flowchart showing a speech recognition method of an electronic device according to an embodiment of the disclosure.

Referring to FIG. 13, the electronic device 100 according to an embodiment of the disclosure may acquire an operation state, and after the electronic device 100 acquires the operation state (YES in operation 921), the electronic device 100 may select a speech recognition model based on the operation state, in operation 922. Operations 921 and 922 may be the same as operation 901 and 902 of FIG. 11.

After the electronic device 100 selects the speech recognition model, the electronic device 100 may determine a sensitivity of the speech recognition model selected based on the operation state, in operation 923. The sensitivity may be an example of a parameter of the speech recognition model. In the current embodiment of the disclosure, the sensitivity may be provided as a parameter of the speech recognition model, however, the electronic device 100 may determine various speech recognition-related parameters based on the operation state.

More specifically, the electronic device 100 may identify a state condition fulfilling the operation state from among predefined conditions for operation states for sensitivities, and determine a sensitivity corresponding to the state condition fulfilling the operation state as a sensitivity of the speech recognition model. For this, a sensitivity table in which sensitivities of speech recognition models match operation states may be stored in the memory 140. The electronic device 100 may compare the operation state of the electronic device 100 to the sensitivity table to determine a sensitivity of a speech recognition model corresponding to the operation state.

Meanwhile, in FIG. 13, operation 923 is shown to be performed after operation 922 is performed, however, operations 922 and 923 may be performed simultaneously.

The electronic device 100 may determine whether the operation state changes, in operation 924. For this, the electronic device 100 may check the operation state in real time or at predefined time intervals.

When the electronic device 100 determines that the operation state changes (YES in operation 924), the electronic device 100 may change the sensitivity based on the changed operation state, in operation 925. More specifically, the electronic device 100 may again determine a sensitivity based on the changed operation state, thereby changing the sensitivity of the speech recognition model to a sensitivity corresponding to the changed operation state.

Thereafter, the electronic device 100 may recognize a user's speech based on the changed sensitivity, in operation 926.

In this way, because a sensitivity of a speech recognition model is determined according to an operation state and the sensitivity also changes according to a change of the operation state, influence by noise of the electronic device 100 may be reduced. Accordingly, accuracy and efficiency of speech recognition may increase.

Particularly, when a speech recognition model is a wakeup word recognition model, a wakeup word may be accurately recognized through sensitivity adjustment despite noise of the electronic device 100. Accordingly, the wakeup word may be recognized quickly and accurately although the user does not again utter the wakeup word.

In the electronic device and the speech recognition method thereof according to an aspect, because speech recognition is performed through a speech recognition model to which a surrounding noise environment including noise generated in the electronic device is reflected, a speech recognition rate and speech recognition accuracy may increase.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be ROM, RAM, a magnetic tape, a magnetic disc, a flash memory, an optical data storage device, etc.

Although a few embodiments of the present disclosure have been shown and described, it would be appreciated by those skilled in the art that changes may be made in these embodiments without departing from the technical principles and essential features of the disclosure, the scope of which is defined in the claims and their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a microphone configured to receive a user's speech;
   a memory for storing a plurality of speech recognition models; and
   at least one processor configured to:
      select a speech recognition model from among the plurality of speech recognition models stored in the memory based on an operation state of the electronic device, and
      recognize the user's speech received by the microphone based on the selected speech recognition model,
   wherein the operation state includes a noise factor from which noise generated by the electronic device may be estimated, and
   wherein the at least one processor is further configured to:
      determine a second noise pattern corresponding to noise generated by the electronic device,
      determine a first noise pattern corresponding to noise generated by a surrounding environment other than the noise generated by the electronic device, based on the second pattern, and
      generate the speech recognition model based on the first noise pattern and store the generated speech recognition model in the memory.

2. The electronic device according to claim 1, wherein the operation state includes at least one of an operation mode or an operation intensity of the electronic device.

3. The electronic device according to claim 1, wherein the at least one processor is further configured to select a speech recognition model corresponding to a state condition fulfilling the operation state from among a plurality of state conditions respectively matching the plurality of speech recognition models, as a speech recognition model corresponding to the operation state.

4. The electronic device according to claim 1, wherein the at least one processor is further configured to:
change, when the operation state changes, the selected speech recognition model based on the changed operation state, and
recognize the user's speech based on the changed speech recognition model.

5. The electronic device according to claim 1, wherein the at least one processor is further configured to:
determine a sensitivity of the selected speech recognition model based on the operation state, and
recognize the user's speech based on the determined sensitivity.

6. The electronic device according to claim 5, wherein the at least one processor is further configured to change, when the operation state changes, the sensitivity based on the changed operation state.

7. The electronic device according to claim 5, wherein the at least one processor is further configured to:
determine a user's intention based on a result of speech recognition on the user's speech, and
change the sensitivity based on the user's intention.

8. The electronic device according to claim 1, wherein the at least one processor is further configured to:
determine the first pattern corresponding to the noise generated by the surrounding environment based on the operation state of the electronic device.

9. The electronic device according to claim 1, wherein the at least one processor is further configured to:
determine the second pattern corresponding to the noise generated by electronic device based on the operation state of the electronic device.

10. The electronic device according to claim 1, wherein the plurality of speech recognition models comprises a plurality of speech recognition models for recognizing a wakeup word.

11. The electronic device according to claim 1, wherein the electronic device comprises at least one of a cleaner, an air conditioner, a refrigerator, a washing machine, or a clothes care apparatus.

12. An electronic device comprising:
a microphone configured to receive a user's speech;
a transceiver configured to communicate with a server; and
at least one processor configured to:
select a speech recognition model from among a plurality of speech recognition models received from the server based on an operation state of the electronic device, and
recognize the user's speech received by the microphone based on the selected speech recognition model,
wherein the operation state includes a noise factor from which noise generated by the electronic device may be estimated, and
wherein the at least one processor is further configured to:
determine a second noise pattern corresponding to noise generated by the electronic device,
determine a first noise pattern corresponding to noise generated by a surrounding environment other than the noise generated by the electronic device, based on the second pattern, and
generate the speech recognition model based on the first noise pattern and store the generated speech recognition model in the server.

13. A speech recognition method of an electronic device, the speech recognition method comprising:
determining a second noise pattern corresponding to noise generated by the electronic device;
determining a first noise pattern corresponding to noise generated by a surrounding environment other than the noise generated by the electronic device, based on the second pattern; and
generating a speech recognition model based on the first noise pattern;
receiving a user's speech;
selecting a speech recognition model from among a plurality of speech recognition models stored in a memory, based on an operation state of the electronic device, the plurality of speech recognition models including the generated speech recognition model; and
recognizing the user's speech based on the selected speech recognition model,
wherein the operation state includes a noise factor from which noise generated by the electronic device may be estimated.

14. The speech recognition method according to claim 13, wherein the selecting of the speech recognition model comprises:
selecting a speech recognition model corresponding to a state condition fulfilling the operation state from among a plurality of state conditions respectively matching the plurality of speech recognition models, as a speech recognition model corresponding to the operation state.

15. The speech recognition method according to claim 13, further comprising:
changing, when the operation state changes, the selected speech recognition model based on the changed operation state,
wherein the recognizing of the user's speech comprises recognizing the user's speech based on the changed speech recognition model.

16. The speech recognition method according to claim 13, further comprising:
determining a sensitivity of the selected speech recognition model based on the operation state,
wherein the recognizing of the user's speech based on the selected speech recognition model comprises recognizing the user's speech based on the determined sensitivity.

17. The speech recognition method according to claim 16, further comprising:
changing, when the operation state changes, the sensitivity of the selected speech recognition model based on the changed operation state,
wherein the recognizing of the user's speech based on the selected speech recognition model comprises recognizing the user's speech based on the changed sensitivity.

18. The speech recognition method according to claim 16, further comprising:
determining a user's intention based on a result of speech recognition on the user's speech; and
changing the sensitivity based on the user's intention.

19. The speech recognition method according to claim 13 wherein the first pattern corresponding to noise generated by a surrounding environment is determined based on the operation state of the electronic device.

20. The speech recognition method according to claim 13, wherein the second pattern corresponding to noise generated by the electronic device is determined based on the operation state of the electronic device.

21. The speech recognition method according to claim 13, further comprising:
   determining the operation state based on a current location of the electronic device.

22. The speech recognition method according to claim 13, further comprising:
   determining the operation state based on an operation intensity of the electronic device,
   wherein the operation intensity is based on a speed of operation of a component of the electronic device.

23. The speech recognition method according to claim 22, wherein the component of the electronic device comprises at least one of a motor, a fan or a brush.

\* \* \* \* \*